(12) United States Patent
Orr et al.

(10) Patent No.: US 6,301,993 B1
(45) Date of Patent: Oct. 16, 2001

(54) CAM-GUIDED ADJUSTABLE PEDAL ACTUATOR ASSEMBLY

(75) Inventors: Brian Norman Orr, Chesterfield; Waldemar Wawrzyniec Gmurowski, Sterling Heights, both of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/420,353

(22) Filed: Oct. 18, 1999

Related U.S. Application Data
(60) Provisional application No. 60/136,918, filed on Jun. 1, 1999.

(51) Int. Cl.[7] .............................. G05G 1/14; F16H 53/00; F16H 53/06
(52) U.S. Cl. ................. 74/512; 74/560; 74/513; 74/567; 74/569
(58) Field of Search .......................... 74/512, 513, 560, 74/567, 569; 180/320, 334, 335; 192/3 T, 3 S, 3 R

(56) References Cited

U.S. PATENT DOCUMENTS

| | | |
|---|---|---|
| 3,631,739 | 1/1972 | McArthur . |
| 3,643,524 | 2/1972 | Herring . |
| 3,643,525 | 2/1972 | Gibas . |
| 3,798,995 * | 3/1974 | Schroter ................................ 74/512 |
| 3,828,625 | 8/1974 | Bruhn, Jr. . |
| 3,944,012 * | 3/1976 | La Chiusa ........................ 180/77 R |
| 3,975,972 | 8/1976 | Muhleck . |
| 4,546,667 | 10/1985 | Bopst, III . |
| 4,870,871 | 10/1989 | Ivan . |
| 4,875,385 | 10/1989 | Sitrin . |
| 5,010,782 | 4/1991 | Asano et al. . |
| 5,056,742 | 10/1991 | Sakurai . |
| 5,078,024 | 1/1992 | Cicotte et al. . |
| 5,086,663 | 2/1992 | Asano et al. . |
| 5,351,573 | 10/1994 | Cicotte . |
| 5,460,061 | 10/1995 | Redding et al. . |
| 5,497,677 | 3/1996 | Baumann et al. . |
| 5,771,752 | 6/1998 | Cicotte . |
| 5,937,707 * | 8/1999 | Rixon et al. ........................... 74/560 |
| 6,151,986 * | 11/2000 | Willemsen et al. ................... 74/512 |

FOREIGN PATENT DOCUMENTS 0410815A   1/1991   (EP) .

OTHER PUBLICATIONS

International Search Report for PCT/US00/14454.

* cited by examiner

Primary Examiner—Vinh T. Luong
(74) Attorney, Agent, or Firm—Kathryn A. Marra

(57) ABSTRACT

A cam-guided adjustable pedal actuator assembly for a vehicle includes a housing for connection to vehicle structure and a linear actuator operatively connected to the housing. The cam-guided adjustable pedal actuator assembly also includes a pedal operatively connected to the linear actuator for adjusting a position of the pedal relative to the housing. The pedal has a cam surface to cooperate with the housing as a force is applied to the pedal such that the housing and the pedal effectively act as one solid member to transfer force to an actuating member in a manner of a conventional pedal.

20 Claims, 4 Drawing Sheets

CAM-GUIDED ADJUSTABLE PEDAL ACTUATOR ASSEMBLY

This application claims priority to provisional application Ser. No. 60/136,918 filed Jun. 1, 1999.

TECHNICAL FIELD

The present invention relates generally to pedals for vehicles and, more particularly, to a cam-guided adjustable pedal actuator assembly for a vehicle.

BACKGROUND OF THE INVENTION

It is known to provide a vehicle body of a vehicle with a floorpan and a toepan extending upwardly at an angle from the floorpan. It is also known to provide the vehicle with movable pedals operatively connected to the toepan. In most vehicles, a fuel pedal is mounted on a right side of the toepan and a brake pedal mounted on a left side of the toepan. Also, the vehicle includes a seat spaced longitudinally from the pedals in which a driver of the vehicle sits. In some vehicles, the seat is adjustable longitudinally relative to the pedals and toepan. In other vehicles, the pedals are adjustable longitudinally relative to a fixed seat of the vehicle.

It is also known that driver occupants of vehicles may have different statures ranging from short to tall.

It is desirable to provide variable positioning of the pedals for different size driver occupants while maintaining a predetermined distance from a steering wheel. It is also desirable to provide an actuator for the adjustment of foot operated pedals in a vehicle. It is further desirable to provide an adjustable pedal relative to a fixed position of a seat in a vehicle.

SUMMARY OF THE INVENTION

It is, therefore, one object of the present invention to provide an adjustable pedal assembly for a vehicle.

It is another object of the present invention to provide an actuator for the adjustment of foot operated pedals for a vehicle.

It is yet another object to provide an adjustable pedal actuator assembly for a vehicle.

To achieve the foregoing objects, the present invention is a cam-guided adjustable pedal actuator assembly for a vehicle including a housing for connection to vehicle structure and a linear actuator operatively connected to the housing. The cam-guided adjustable pedal actuator assembly also includes a pedal operatively connected to the linear actuator for adjusting a position of the pedal relative to the housing. The pedal has a cam surface to cooperate with the housing as a force is applied to the pedal such that the housing and the pedal effectively act as one solid member to transfer force to an actuating member in a manner of a conventional pedal.

One advantage of the present invention is that a cam-guided adjustable pedal actuator assembly is provided for a vehicle. Another advantage of the present invention is that the cam-guided adjustable pedal actuator assembly provides adjustable pedals relative to a fixed position of a seat of a vehicle. Yet another advantage of the present invention is that the cam-guided adjustable pedal actuator assembly allows for a variety of distances between a driver occupant and a steering wheel in a vehicle. Still another advantage of the present invention is that the cam-guided adjustable pedal actuator assembly can generate any trajectory without the use of multiple linkages and can be made to move rearward and downward for the entire stroke. A further advantage of the present invention is that the cam-guided adjustable pedal actuator assembly requires no change to any existing location of push-rod, cable or pivots and can be interchangeable with a conventional pedal assembly. Yet a further advantage of the present invention is that the cam-guided adjustable pedal actuator assembly maintains a constant relative offset between pedals during entire adjustment travel. Still a further advantage of the present invention is that the cam-guided adjustable pedal actuator assembly has forces transferred through structural components and not the actuating mechanism during frontal impacts of the vehicle. Yet still a further advantage of the cam-guided adjustable pedal actuator assembly is that it fits into smaller packaging space as a result of its vertical configuration. Another advantage of the present invention is that the cam-guided adjustable pedal actuator assembly has lower cost due to decreased complexity and materials, higher quality, and better durability.

Other objects, features and advantages of the present invention will be readily appreciated, as the same becomes better understood after reading the subsequent description taken in conjunction with the accompanying drawings.

DESCRIPTION OF THE PREFERRED EMBODIMENT

Figure 1:
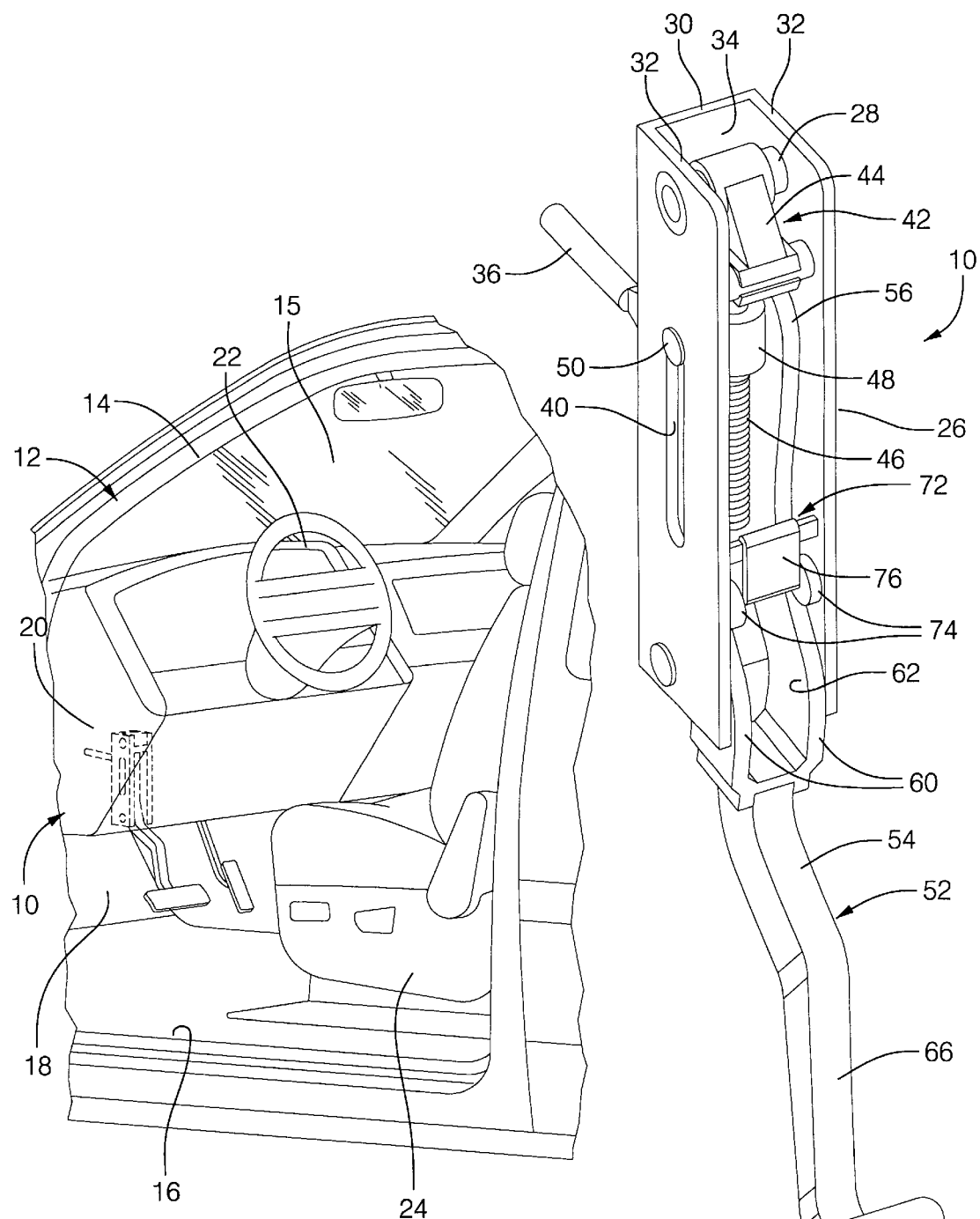
FIG. 1 is a perspective view of a cam-guided adjustable pedal actuator assembly, according to the present invention, illustrated in operational relationship with a vehicle.
Figure 2:
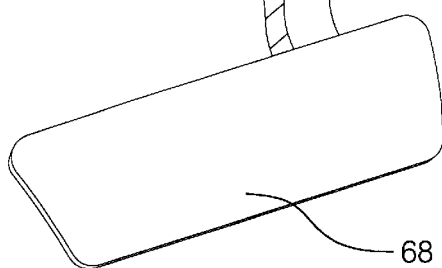
FIG. 2 is an enlarged perspective view of the cam-guided adjustable pedal actuator assembly of FIG. 1.

Referring to the drawings and in particular FIGS. 1 and 2, one embodiment of a cam-guided adjustable pedal actuator assembly 10, according to the present invention, is shown for a vehicle (partially shown), generally indicated at 12. The vehicle 12 includes a vehicle body 14 forming an occupant compartment 15. The vehicle body 14 includes a floorpan 16 and a toepan 18 extending upwardly at an angle from the floorpan 16 and fixed relative thereto. The vehicle 12 also includes an instrument panel 20 extending upwardly from and laterally across the toepan 18 and spaced from the floorpan 16. The vehicle 12 includes a steering wheel 22 mounted to the instrument panel 20. The vehicle 12 also includes a seat 24 mounted by suitable means (not shown) to the floorpan 16 in the occupant compartment 15 of the vehicle body 14. In this embodiment, the seat 24 is a driver occupant seat of the vehicle 12. A driver occupant (not shown) is seated in the seat 24 and grasps the steering wheel 22 to operate the cam-guided adjustable pedal actuator assembly 10 to be described with his/her foot. It should be appreciated that, except for the cam-guided adjustable pedal actuator assembly 10, the vehicle 12 is conventional and known in the art.

Figure 3:
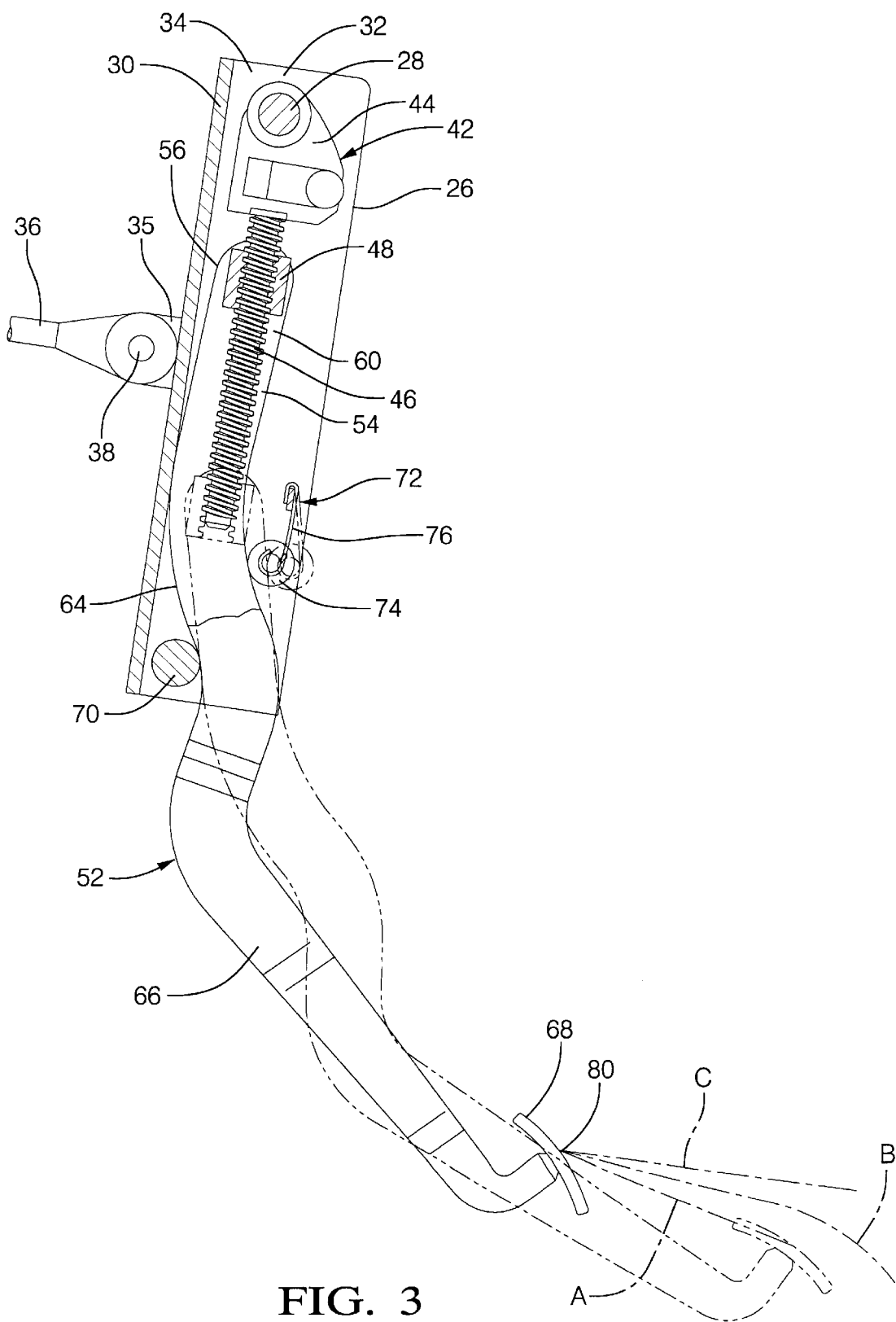
FIG. 3 is a fragmentary side elevational view of the cam-guided adjustable pedal actuator assembly of FIG. 1 illustrating a first position and a second position.
Figure 4:
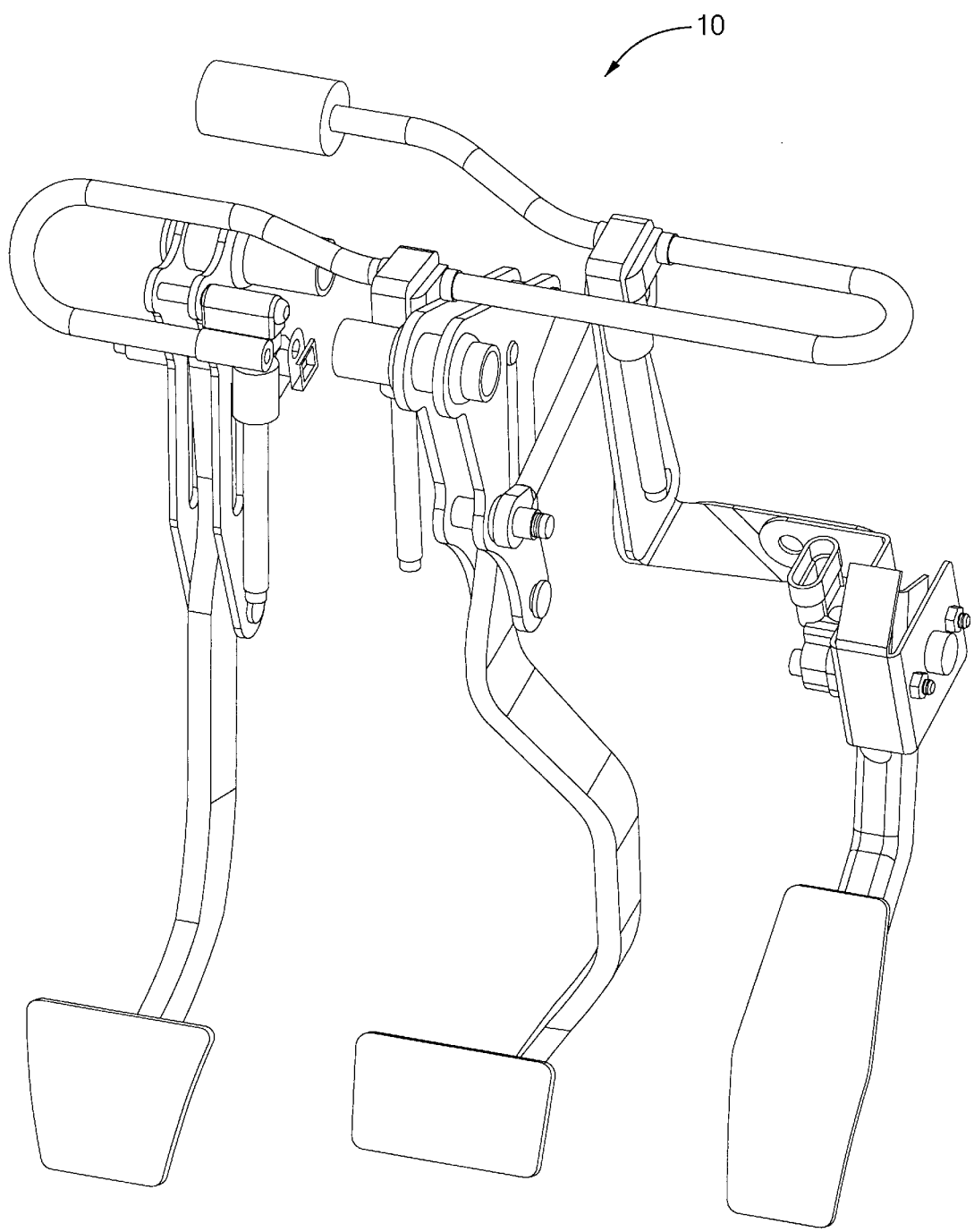
FIG. 4 is a perspective view of the cam-guided adjustable pedal actuator assembly of FIG. 1 illustrating an accelerator, brake and clutch pedal applications.

Referring to FIGS. 1 through 3, the cam-guided adjustable pedal actuator assembly 10, according to the present invention, is shown to adjust a foot-operated control such as a brake pedal of the vehicle 12. The cam-guided adjustable pedal actuator assembly 10 includes a pedal housing 26 fixed rotatably to a pivot axis such as a pin 28. The pin 28 is rotatably connected to the toepan 18 by suitable means such as a bracket (not shown). The pedal housing 26 extends longitudinally and is orientated generally vertically. The pedal housing 26 has a generally U-shaped cross-section. The pedal housing 26 has a base wall 30 and a pair of side walls 32 extending generally perpendicular to the base wall 30 to form a channel 34. The pin 28 extends through the side walls 32 and channel 34 at an upper end thereof. The pedal housing 26 is made of a rigid material such as metal. The pedal housing 26 has a flange 35 extending outwardly from the base wall 30 and is connected to a brake booster pushrod 36 by suitable means such as a pivot pin 38. The housing 26 also has a slot 40 extending longitudinally in each side wall 32 for a function to be described. It should be appreciated that a cable (not shown) may be pulled rather than a pushrod actuated. It should also be appreciated that the cam-guided adjustable actuator assembly 10 may be used to adjust any or all of the foot operated controls including the brake, accelerator or clutch pedals of the vehicle 12, driven by a single electric motor (not shown) as illustrated in FIG. 4.

The cam-guided adjustable pedal actuator assembly 10 includes a linear actuator, generally indicated at 42, disposed inside the channel 34 and attached to an upper end of the pedal housing 26 by suitable means such as the pin 28. The linear actuator 42 is of a screw type and has a base 44 disposed about the pin 28 and a threaded screw 46 extending longitudinally in the channel 34 between the side walls 32. The linear actuator 42 also includes a threaded nut 48 threadably engaging the screw 46 for movement therealong. The nut 40 has at least one, preferably two studs 50 extending laterally through the slots 40 in the side walls 32 of the pedal housing 26. It should be appreciated that the studs 50 move along the slots 40 and prevent the nut 48 from rotating. It should also be appreciated that the slots 40 are generally parallel to the linear actuator 42.

The cam-guided adjustable pedal actuator assembly 10 also includes a pedal, generally indicated at 52, mounted to the linear actuator 42. In the embodiment illustrated, the pedal 52 is a brake pedal. The pedal 52 includes an arm 54 having an upper portion 56. The upper portion 56 has a pair of side walls 60. The upper portion 56 is supported vertically on an upper end thereof by the studs 50, which extend through apertures (not shown) in the side walls 60 of the upper portion 56. Each of the side walls 60 has a cam surface 64 to be described. The pedal 52 also includes a lower portion 66 extending downwardly and outwardly from a lower end of the upper portion 56. The pedal 52 further includes a pad 68 attached to a lower end of the lower portion 66. The pad 68 extends transversely a predetermined distance to be contacted by a foot of a driver occupant.

The cam-guided adjustable pedal actuator assembly 10 includes a cam roller or pin 70 rotatably attached to a lower end of the pedal housing 26. The cam pin 70 extends laterally between the side walls 32 of the pedal housing 26 and contacts the cam surface 64 of the side walls 60 of the pedal 52 for sliding contact therebetween. It should be appreciated that the cam pin 70 may be replaced with a roller for the purpose of creating a rolling contact with the cam surface 64 as opposed to a sliding contact.

The cam-guided adjustable pedal actuator assembly 10 also includes a retainer assembly, generally indicated at 72, to urge the upper portion 56 of the pedal 52 toward the base wall 30 of the pedal housing 26. The retainer assembly 72 includes a roller 74 to contact the side walls 60 of the upper portion 56 of the pedal 52. The retainer assembly 72 also includes a spring 76 having one end connected to the roller 74 and another end connected to a side wall 32 of the pedal housing 26. It should be appreciated that spring 76 loads the roller 74 against the arm 54 of the pedal 52.

In operation, the cam-guided adjustable pedal actuator assembly 10 is illustrated in a first or current position in solid lines in FIG. 3. With no external force applied to the pad 68 of the pedal 52, the arm 54 is supported against rotation about studs 50 by cam pin 70 and roller 74 of the retainer assembly 72. During a braking function, the driver occupant applies a force to the pad 68 with his/her foot. Under application of the force to the pad 68, the force is transferred to the pedal housing 26 by studs 50 contacting slots 40 and cam pin 70 contacting cam surface 64. Frictional forces acting at the contact points of the cam pin 70 and cam surface 64, as well as studs 50 and slots 40, isolate linear actuator 42 from high loads applied to the pad 68 during braking. The geometry of the cam surface 64 and slots 40 direct components of frictional forces along an axis of the screw 46 of the linear actuator 42 in opposition to the impending motion of the arm 54 of the pedal 52. Thus, with increasing load, the arm 54 becomes increasingly locked against upward translation in the pedal housing 26. It should be appreciated that the loads are transferred through structural components and not through the linear actuator 42. It should be appreciated that, as the force is applied to the pad 68, the pedal housing 26 and arm 54 of the pedal 52 effectively act as one solid member to transfer force to the brake booster (not shown) via the brake booster pushrod 36 in the manner of a conventional brake pedal.

For the adjusting function, the cam-guided adjustable pedal actuator assembly 10 is illustrated in a second or adjusted position in phantom lines in FIG. 3. For example, it may be desired that a point 80 on the pad 68 follow a trajectory A, which is a straight line. The screw 46 is rotated manually and moves the nut 48 therealong to lower the pad 68 of the pedal 52 and extend the pad 68 closer to the seat 24. The combination of the motion of the upper portion 56 of the arm 54 guided by slot 40, which is straight, and geometry of the cam surface 64 generate the required trajectory A of point 80. This motion provides the range of adjustment to accommodate a range of driver sizes. It should be appreciated that if a different trajectory shape and/or length is required, such as trajectories B or C, it may be obtained by reshaping the geometry of the cam surface 64 and/or altering the direction and/or shape of the slots 40.

Figure 5:
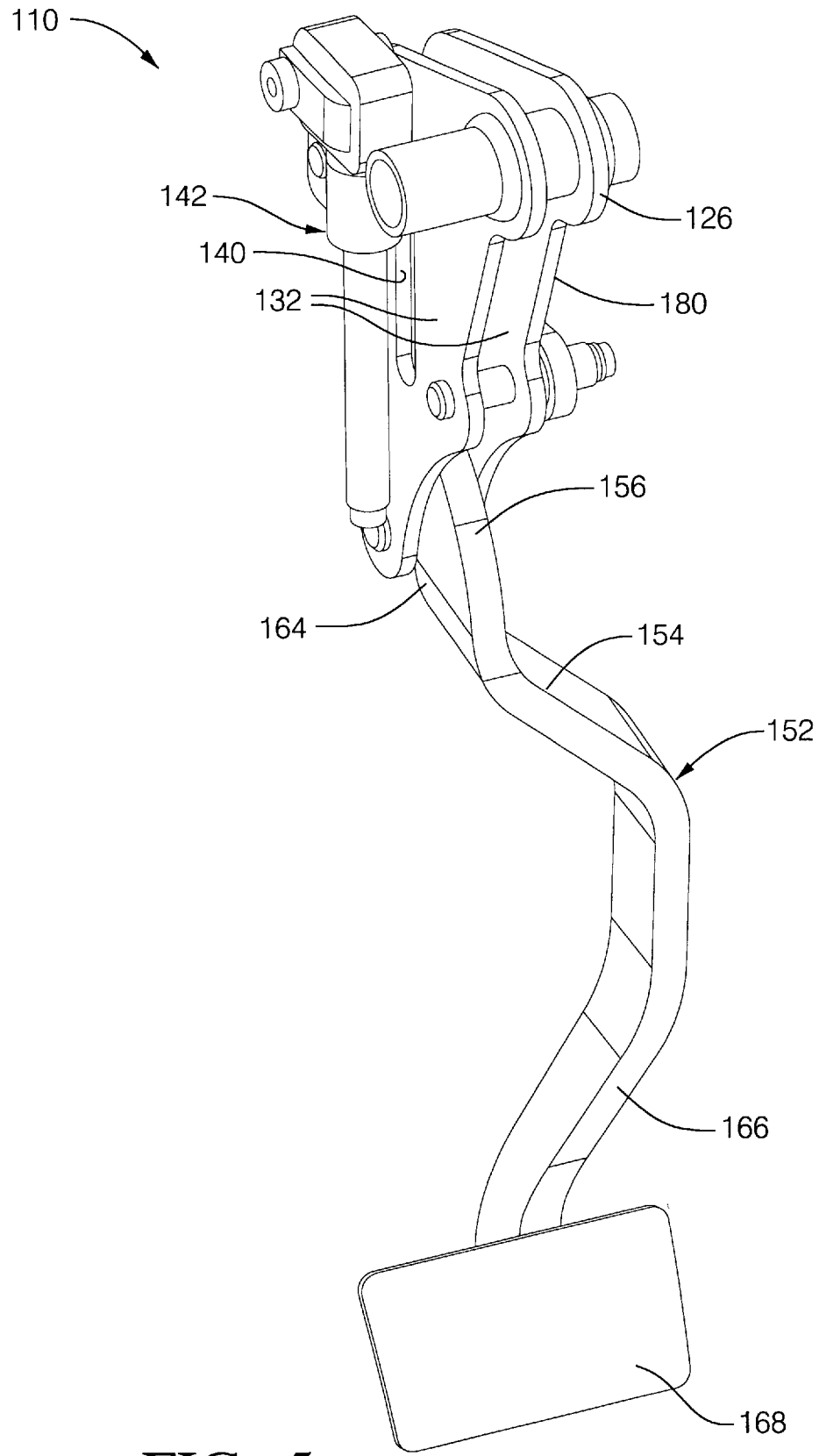
FIG. 5 is an enlarged perspective view of another embodiment, according to the present invention, of the cam-guided adjustable pedal actuator assembly of FIG. 1.

Referring to FIG. 5, another embodiment 110, according to the present invention, is shown for the cam-guided adjustable pedal actuator assembly 10. Like parts of the cam-guided adjustable pedal actuator assembly 10 have like reference numerals increased by one hundred (100). In this embodiment, the cam-guided adjustable pedal actuator assembly 110 includes a single arm 154 having the cam surface 164 on the upper portion 156 thereof. The upper portion 156 of the arm 154 is sandwiched in a slidable manner between two plates 180, which are the side walls 132 of the pedal housing 126. The cam-guided adjustable pedal actuator assembly 110 also includes the linear actuator 142 mounted on a side of the pedal housing 126. The linear actuator 142 has the nut 148 with a single stud (not shown) which extends through the slots 140 in the side walls 132 of the pedal housing 126. The cam-guided adjustable pedal actuator assembly 110 includes the retainer assembly (not shown). The operation of the cam-guided pedal adjustable actuator assembly 110 is similar to the cam-guided adjustable pedal actuator assembly 10.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A cam-guided adjustable pedal actuator assembly for a vehicle comprising:
    a housing adapted for connection to a vehicle structure;
    a linear actuator operatively connected to said housing
    a pedal connected to said linear actuator for adjusting a position of said pedal relative to said housing; and
    said pedal having a cam surface to cooperate with a fixed portion of said housing as a force is applied to said pedal such that said housing and said pedal effectively act as one solid member adapted to transfer force to an actuating member.

2. A cam-guided adjustable pedal actuator assembly as set forth in claim 1 wherein said fixed portion of said housing comprises a roller connected to said housing to cooperate with said cam surface.

3. A cam-guided adjustable pedal actuator assembly as set forth in claim 2 including a retainer assembly for urging said cam surface toward said roller.

4. A cam-guided adjustable pedal actuator assembly as set forth in claim 1 wherein said pedal comprises an arm and a pad connected to a lower end of said arm.

5. A cam-guided adjustable pedal actuator assembly as set forth in claim 4 wherein said arm has an upper portion, said cam surface extending along said upper portion.

6. A cam-guided adjustable pedal actuator assembly for a vehicle comprising:
    a housing adapted for connection to a vehicle structure;
    a linear actuator operatively connected to said housing;
    a pedal operatively connected to said linear actuator for adjusting a position of said pedal relative to said housing;
    said pedal having a cam surface to cooperate with said housing as a force is applied to said pedal such that said housing and said pedal effectively act as one solid member adapted to transfer force to an actuating member;
    a roller connected to said housing to cooperate with said cam surface;
    a retainer assembly for urging said cam surface toward said roller; and
    wherein said retainer assembly comprises said roller for contacting said pedal and a spring connected to said roller and said housing for urging said roller against said pedal.

7. A cam-guided adjustable pedal actuator assembly for a vehicle comprising:
    a housing adapted for connection to a vehicle structure;
    a linear actuator operatively connected to said housing;
    a pedal operatively connected to said linear actuator for adjusting a position of said pedal relative to said housing;
    said pedal having a cam surface to cooperate with said housing as a force is applied to said pedal such that said housing and said pedal effectively act as one solid member adapted to transfer force to an actuating member; and
    wherein said linear actuator comprises a base operatively connected to said housing, a screw connected to said base and a nut connected to said pedal and engaging said screw for movement therealong.

8. A cam-guided adjustable pedal actuator assembly as set forth in claim 7 wherein said housing has a pair of opposed slots spaced laterally and extending longitudinally.

9. A cam-guided adjustable pedal actuator assembly as set forth in claim 8 wherein said nut includes at least one stud extending laterally and into said slots to prevent said nut from rotating and for movement therealong.

10. A cam-guided adjustable pedal actuator assembly as set forth in claim 9 wherein said slots are linear shaped.

11. A cam-guided adjustable pedal actuator assembly as set forth in claim 9 wherein said housing has a base wall and a pair of laterally spaced side walls extending from said base wall, one of said slots extending along one of said side walls.

12. A cam-guided adjustable pedal actuator assembly as set forth in claim 11 wherein said housing has a flange extending from said base wall adapted for connection to the actuating member.

13. A cam-guided adjustable pedal actuator assembly for a vehicle comprising:
    a housing adapted for connection to a vehicle structure;
    a linear actuator operatively connected to said housing;
    a pedal connected to said linear actuator for adjusting a position of said pedal relative to said housing;
    a fixed roller connected to said housing; and
    said pedal having an arm and a pad connected to said arm, said arm having a cam surface to cooperate with said roller as a force is applied to said pedal such that said housing and said pedal effectively act as one solid member adapted to transfer force to an actuating member.

14. A cam-guided adjustable pedal actuator assembly as set forth in claim 13 including a retainer assembly for urging said cam surface toward said roller.

15. A cam-guided adjustable pedal actuator assembly for a vehicle comprising:
    a housing adapted for connection to a vehicle structure;
    a linear actuator operatively connected to said housing;
    a pedal operatively connected to said linear actuator for adjusting a position of said pedal relative to said housing;
    a roller connected to said housing;
    said pedal having an arm and a pad connected to said arm, said arm having a cam surface to cooperate with said roller as a force is applied to said pedal such that said housing and said pedal effectively act as one solid member adapted to transfer force to an actuating member; and
    wherein said linear actuator comprises a base operatively connected to said housing, a screw connected to said base and a nut connected to said pedal and engaging said screw for movement therealong.

16. A cam-guided adjustable pedal actuator assembly as set forth in claim 15 wherein said housing has a pair of opposed slots spaced laterally and extending longitudinally.

17. A cam-guided adjustable pedal actuator assembly as set forth in claim 16 wherein said nut includes at least one stud extending laterally and into said slots to prevent said nut from rotating and for movement therealong.

18. A cam-guided adjustable pedal actuator assembly as set forth in claim 17 wherein said housing has a pair of laterally spaced side walls, one of said slots extending along one of said side walls.

19. A cam-guided adjustable pedal actuator assembly for a vehicle comprising:

a housing adapted for connection to a vehicle structure;

a linear actuator operatively connected to said housing;

a pedal operatively connected to said linear actuator for adjusting a position of said pedal relative to said housing;

a roller connected to said housing;

said pedal having an arm and a pad connected to said arm, said arm having a cam surface to cooperate with said roller as a force is applied to said pedal such that said housing and said pedal effectively act as one solid member adapted to transfer force to an actuating member;

a retainer assembly for urging said cam surface toward said roller; and wherein said retainer assembly comprises said roller for contacting said pedal and a spring connected to said roller and said housing for urging said roller against said pedal.

20. A cam-guided adjustable pedal actuator assembly for a vehicle comprising:

a housing adapted for connection to a vehicle structure, said housing having a pair of laterally spaced side walls, each of said side walls having a slot extending longitudinally therealong;

a linear actuator comprising a base operatively connected to said housing, a screw connected to said base and a nut engaging said screw for movement therealong, said nut having at least one stud extending laterally and into said slots to prevent said nut from rotating and for movement therealong;

a pedal connected to said nut for adjusting a position of said pedal relative to said housing;

a roller connected to said housing; and said pedal having a cam surface to cooperate with said roller as a force is applied to said pedal such that said housing and said pedal effectively act as one solid member adapted to transfer force to an actuating member.

* * * * *